United States Patent
Kwan et al.

(10) Patent No.: US 7,981,210 B2
(45) Date of Patent: *Jul. 19, 2011

(54) CAPILLARY-ACTION, GLITTER MARKERS AND INK COMPOSITIONS FOR SAME

(75) Inventors: Wing Sum Vincent Kwan, Chicago, IL (US); Jennifer Carra, Bolingbrook, IL (US)

(73) Assignee: Sanford, L.P., Oak Brook, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/111,177

(22) Filed: Apr. 28, 2008

(65) Prior Publication Data

US 2009/0025602 A1    Jan. 29, 2009

Related U.S. Application Data

(63) Continuation of application No. 10/945,161, filed on Sep. 20, 2004, now Pat. No. 7,364,614.

(60) Provisional application No. 60/504,236, filed on Sep. 19, 2003.

(51) Int. Cl.
*C09D 11/16* (2006.01)
(52) U.S. Cl. ............... 106/31.86; 106/31.65; 106/31.28
(58) Field of Classification Search ............... 106/31.86, 106/31.65, 31.28
See application file for complete search history.

(56) References Cited

U.S. PATENT DOCUMENTS

| | | | |
|---|---|---|---|
| 4,545,819 A | 10/1985 | Shioi et al. | |
| 4,657,591 A | 4/1987 | Shioi et al. | |
| 5,474,603 A | 12/1995 | Miyashita et al. | |
| 5,762,694 A | 6/1998 | Yokoi et al. | |
| 6,063,176 A | 5/2000 | Lyen et al. | |
| 6,083,311 A | 7/2000 | Kanbayashi et al. | |
| 6,099,629 A | 8/2000 | Morita et al. | |
| 6,120,590 A | 9/2000 | Miyamoto et al. | |
| 6,171,381 B1 | 1/2001 | Yoshimura et al. | |
| 6,224,284 B1 | 5/2001 | Sukhna et al. | |
| 6,402,412 B2 | 6/2002 | Sukhna et al. | |
| 6,524,382 B1 | 2/2003 | Bujard et al. | |
| 6,533,857 B1 | 3/2003 | Schmid et al. | |
| 6,544,323 B2 | 4/2003 | An et al. | |
| 6,561,713 B2 | 5/2003 | Sukhna et al. | |
| 6,599,353 B2 | 7/2003 | Spencer et al. | |
| 6,616,741 B1 * | 9/2003 | Sawa et al. | 106/31.68 |
| 6,663,704 B2 | 12/2003 | Spencer et al. | |
| 6,706,103 B2 | 3/2004 | Yoshimura et al. | |
| 6,730,154 B2 | 5/2004 | Inoue et al. | |
| 6,730,717 B2 | 5/2004 | Yoshimura et al. | |
| 6,749,676 B2 | 6/2004 | Spencer et al. | |
| 2001/0003262 A1 | 6/2001 | Yoshimura et al. | |
| 2001/0019682 A1 | 9/2001 | Sukhna et al. | |
| 2002/0033116 A1 | 3/2002 | Spencer et al. | |
| 2002/0033117 A1 | 3/2002 | Inoue et al. | |
| 2002/0096083 A1 | 7/2002 | Spencer et al. | |
| 2002/0128350 A1 | 9/2002 | Yoshimura et al. | |
| 2002/0148387 A1 | 10/2002 | An | |
| 2002/0197096 A1 | 12/2002 | Sukhna et al. | |
| 2003/0041776 A1 | 3/2003 | Spencer et al. | |
| 2003/0129015 A1 | 7/2003 | Sexton | |
| 2003/0212179 A1 | 11/2003 | Yadav et al. | |
| 2003/0215281 A1 | 11/2003 | Sexton et al. | |

FOREIGN PATENT DOCUMENTS

| | | |
|---|---|---|
| JP | 2001354893 | 12/2001 |
| JP | 2003128974 | 5/2003 |
| JP | 2003221542 | 8/2003 |
| WO | WO-0116236 | 3/2001 |
| WO | WO-03044104 | 5/2003 |
| WO | WO 03044104 A1 * | 5/2003 |

OTHER PUBLICATIONS

English Machine translation of JP 2003-128974.*
International Search Report for PCT/US2004/030662 dated Jan. 31, 2005.
Written Opinion of the International Searching Authority for PCT/US2004/030662 dated Jan. 31, 2005.

* cited by examiner

*Primary Examiner* — Jerry Lorengo
*Assistant Examiner* — Veronica F Faison
(74) *Attorney, Agent, or Firm* — Marshall, Gerstein & Borun LLP

(57) ABSTRACT

The disclosure is generally related to writing instruments capable of making markings containing large diameter glitter pigment particles, and glitter ink compositions for the same. In one embodiment, the disclosure provides a capillary-action marker comprising a glitter ink composition, a low density ink reservoir for storing the glitter ink composition, and a porous nib in fluid communication with the low density ink reservoir, wherein the glitter ink composition comprises glitter pigment particles having a particle size greater than about 12.1 microns in at least one dimension.

47 Claims, No Drawings

CAPILLARY-ACTION, GLITTER MARKERS AND INK COMPOSITIONS FOR SAME

CROSS-REFERENCE TO RELATED APPLICATION

This is a continuation of U.S. patent application Ser. No. 10/945,161, filed Sep. 20, 2004 (now U.S. Pat. No. 7,364,614), which claims the benefit under 35 U.S.C. §119(e) of U.S. Provisional Patent Application Ser. No. 60/504,236, filed Sep. 19, 2003, the entire respective disclosures of which are incorporated herein by reference.

FIELD OF THE DISCLOSURE

The disclosure is generally related to writing instruments capable of making markings containing large diameter glitter pigment particles, and glitter ink compositions for the same. More particularly, the disclosure is related to capillary-action markers capable of making written markings containing large diameter glitter pigment particles, and glitter ink compositions for the same.

BACKGROUND OF THE DISCLOSURE

Children are fascinated by shiny, glitter-like materials. For example, the multi-directional reflection of light from glitter-like materials captivates children's attention and stimulates their sense of sight. Therefore, when children use writing instruments capable of making markings containing glitter-like materials, their attention span and creativity are increased. Consequently, it is highly desirable to provide such writing instruments. Capillary-action markers capable of making markings containing glitter-like materials are particularly desirable as such writing instruments are capable of making relatively larger written markings, and therefore a relatively greater glitter effect.

Writing instruments capable of making markings containing glitter-like materials are known. For example, valve-action markers capable of making written markings containing glitter-like materials have been developed. Such valve-action markers utilize a spring-loaded nib, which opens a valve to an ink reservoir when depressed (e.g., against a writing surface), thereby allowing the ink to flow from the ink reservoir to the nib. Such valve-action markers require more parts than conventional capillary-action markers, and consequently its manufacture is more complicated and costly.

Additionally, the glitter-like materials tend to settle to the bottom of the ink reservoir when such valve-action markers are not in use. Therefore, the user typically has to violently shake the marker prior to use in order to effect distribution of the aluminum flakes throughout the ink composition and ensure that the ink composition delivered to the marker nib contains sufficient amounts of glitter-like material to produce the desired visual effect. Additionally, the user typically has no means to verify that the glitter-like material has been adequately distributed throughout the ink composition because the marker barrel is opaque. The user must also subsequently depress the nib against a writing surface to open the valve to the ink reservoir and allow delivery of the ink composition to the nib. These shaking and depressing actions may not be intuitive to children.

U.S. Pat. No. 6,120,590 to Miyamoto discloses a ball point pen containing a water-based, thixotropic gel ink having metallic lustrous color. Such thixotropic gel inks, however, are too viscous to be successfully adapted for use in many writing instruments, including capillary-action markers.

Conventional capillary-action markers contain an ink reservoir and a nib in fluid communication therewith. Such markers typically include an ink composition having a low viscosity because the adhesive forces (between the ink composition and the channel walls of the reservoir and/or nib) must exceed the cohesive forces of the ink composition to permit movement of the composition by capillary action. Incorporating glitter-like materials (e.g., aluminum flakes) into the low viscosity ink compositions of capillary-action markers is difficult because such glitter-like materials tend to settle out of the ink compositions. Even when the glitter-like materials are adequately suspended in the ink compositions, the marker's reservoir fibers typically undesirably filter the glitter-like materials and become clogged over time. Accordingly, over time, the marker is rendered incapable of making written markings containing glitter-like materials.

U.S. Pat. No. 6,561,713 discloses an exemplary capillary-action marker capable of making markings containing glitter-like materials. The '713 patent, however, only teaches and suggests aqueous or water-based inks containing metallic pigment particles having a particle size between 1 micron and 12 microns because "if the particle size of the aluminum pigments is too large, greater than 12 microns, they will not flow through the pathways of the filler and the nib." See '713 patent at column 3, lines 44-46. Consequently, the glitter effect provided by markings made with such markers is small, owing to the small size of the pigment particles. Furthermore, the '713 patent explicitly teaches against including dyes as colorants (i.e., rather than pigments) in such metallic ink compositions.

SUMMARY OF THE DISCLOSURE

The disclosure provides capillary-action markers comprising a glitter ink composition comprising glitter pigment particles and at least one solvent, a low density ink reservoir for storing the glitter ink composition, and a porous nib in fluid communication with the low density ink reservoir, wherein the glitter ink composition comprises glitter pigment particles having a particle size greater than about 12.1 microns in at least one dimension.

In an alternative embodiment, the disclosure provides capillary-action markers comprising a glitter ink composition comprising glitter pigment particles and a heteroatom-bearing, water-miscible solvent, a low density ink reservoir for storing the glitter ink composition, and a porous nib in fluid communication with the low density ink reservoir.

In yet another embodiment, the disclosure provides capillary-action markers comprising a glitter ink composition comprising glitter pigment particles, at least one solvent, and a dye, a low density ink reservoir for storing the glitter ink composition, and a porous nib in fluid communication with the low density ink reservoir.

The disclosure also provides glitter ink compositions comprising a heteroatom-bearing, water-miscible solvent, and glitter pigment particles having a particle size greater than about 12.1 microns in at least one dimension.

In a further embodiment, the disclosure provides glitter ink compositions comprising at least one solvent, glitter pigment particles having a particle size greater than about 12.1 microns in at least one dimension, and a dye.

Additionally, the disclosure provides methods of forming a written marking on a substrate comprising the steps of providing a writing instrument containing a glitter ink composition in accordance with the disclosure and making a marking on the substrate with the writing instrument.

BRIEF DESCRIPTION OF THE DRAWING

Exemplary aspects and features of a capillary-action marker in accordance with the disclosure are described and explained in greater detail below with the aid of the sole drawing FIGURE, which illustrates a partially, cut-away view of an exemplary marker according to the disclosure.

DETAILED DESCRIPTION OF THE DISCLOSURE

A capillary-action marker, capable of supplying a steady flow of an ink composition containing glitter pigment particles to a writing surface, includes a glitter ink composition, a low density ink reservoir for storing the glitter ink composition, and a porous nib in fluid communication with the ink reservoir.

The glitter ink composition typically includes glitter pigment particles having a particle size greater than about 12.1 microns in at least one dimension; however, glitter pigment particles of lesser sizes may also be included in the glitter ink compositions. The ink composition also includes at least one solvent. Typically, the ink compositions include water and a heteroatom-bearing, water-miscible co-solvent. The ink compositions can also include coloring agents (i.e., pigments and/or dyes), resins, and other additives known in the art.

Generally, capillary-action markers containing glitter ink compositions can produce written markings or traces containing glitter-like materials on a surface as described herein. The glitter ink compositions can be varied to produce inks suitable for a wide range of applications such as, for example, temporary marking markers including but not limited to dry erase markers and washable markers, and permanent marking markers.

The sole drawing FIGURE is a partially cut-away view of an exemplary marker, generally designated 10. The marker 10 includes a reservoir 12 disposed in a housing or barrel 14. The reservoir 12 is in fluid communication with a porous nib 16. The barrel 14 is sealed by a plug 20, which helps to keep the ink reservoir 12 in place.

Typically, the ink reservoir 12 and the nib 16 are disposed in such a manner relative to each other that the ink composition can be transferred from the ink reservoir 12 to the nib 16 via migration. In the drawing FIGURE, for example, the reservoir 12 and the nib 16 are shown to be in substantial contact with each other at a coupling zone 22. A change in pressure at the coupling zone 22 (either in the ink reservoir 12 or at the nib 16) can pull the ink composition stored in the reservoir 12 across the coupling zone 22 to the nib 16. The ink composition generally moves by capillary action within the reservoir 16, i.e., the ink composition generally moves by capillary action from the distal end of the reservoir 16 to the reservoir end which is proximate to the nib 12. Similarly, the ink composition generally moves within the nib 12 by capillary action, i.e., the ink composition generally moves by capillary action from the portion of the nib 12 which is proximate to the reservoir 16 to the portion of the nib which is applied to a writing surface to make a written mark.

According to a preferred embodiment, the ink reservoir 12 is a wick-type reservoir, and the fibrous nib 16 is in continuous (i.e., permanent) contact therewith. In one embodiment, the coupling zone 22 provides a large surface area for the migration of a glittering ink composition from the reservoir 12 to the nib 16 (relative to the size of the nib). The coupling zone is usually at least about the same, more preferably at least about one and one-half (1.5) times greater than, most preferably at least about two times greater than the size of the nib (in length).

Ranges may be expressed herein as from "about" or "approximately" one particular value and/or to "about" or "approximately" another particular value. When such a range is expressed, another embodiment according to the disclosure includes from the one particular value and/or to the other particular value. Similarly, when particular values are expressed as approximations, by use of antecedents such as "about," "at least about," or "less than about," it will be understood that the particular value forms another embodiment.

Ink Reservoirs

Capillary-action markers useful for delivering ink compositions containing glitter pigment particles having a particle size greater than about 12.1 microns in at least one dimension comprise ink reservoirs having an open structure. Ink reservoirs with medium to high fiber densities are not suitable for delivering glitter pigment particles having a particle size greater than about 12.1 microns because such reservoirs filter and retain the pigment particles within the reservoir fibers. Suitable reservoirs for use in the markers according to the invention preferably have a reservoir fiber density less than about 0.50 gram/cubic centimeter (g/cc), more preferably less than about 0.25 g/cc, and most preferably less than about 0.10 g/cc.

The reservoir fibers can be manufactured from thermoplastic polymers such as, for example, polyesters, nylons, polypropylenes, and mixtures thereof. The fibers inside the reservoir can be linearly-oriented or entangled. To maintain the integrity of the ink reservoir towards aggressive solvents, the reservoir may be wrapped with a sheet of polypropylene or nylon. The reservoirs can be of any dimensions as long as the dimensions are sufficient for storing a predetermined amount of ink and for permitting the reservoir to fit into the desired marker body or housing.

Nibs

The nibs should be sufficiently porous to allow the glitter pigment particles to pass freely therethrough. The nib also should prevent ink compositions from leaking when the nib is downwardly disposed. A suitable nib should have a minimum porosity greater than about 60%, more preferably greater than about 65%, and most preferably greater than about 68%. Fibers of the nib should be compatible with (i.e., insoluble in) the ink composition solvent system and capable of retaining the ink composition. Suitable nib fibers can be manufactured from thermoplastic polymers such as, for example, polyester, polypropylene, nylon, and mixtures thereof. The nib fibers are typically bound by a second resin, which also should be insoluble in the ink composition solvent system. Exemplary resins include polyacetal and melamine.

Glitter Ink Compositions

The ink composition generally includes glitter pigment particles and a coloring agent. The glitter pigment particles typically have a particle size greater than about 12.1 microns in at least one dimension. However, the ink compositions may also (and in some embodiments exclusively) contain glitter pigment particles having a particle size between about 1 micron and about 12 microns. The ink compositions can also include a solvent system containing a heteroatom-bearing, water-miscible solvent. The ink compositions can also include a resin.

Any pigment particles that provide a shimmering, sparkle, or glitter effect (i.e., an effect produced by the multi-directional reflection of light) can be used. Suitable particles include but are not limited to metallic pigments such as gold pigments, copper pigments, nickel pigments, silver pigments, platinum pigments, and aluminum pigments (and includes protected metal particles coated with a monolayer of dipolar molecules to alter surface properties and/or prevent reaction with atmospheric oxygen), dual color pigments (e.g., Duo-Chrome® pigments), holographic pigments, interference pigments, glass pieces, colored and non-colored glass powders, synthetic diamonds (e.g., zirconium flakes), pearlescent pigments, metallized plastics such as metallized polyesters (e.g., metallized polyethylene terephthalates), iridescent pigments, micronized marble particles, micas, other pigments known in the art, and combinations thereof. Suitable pigment particles are available from pigment manufacturers such as, for example, US Aluminum (Flemington, N.J.) and MD-Both Industries (West Chicago, Ill.). The disclosed pigment particles can be coated with a protective coating such as an epoxy coating.

In general, the glitter effect provided by a written mark is directly proportional to the size of the glitter pigment particles in the ink composition used to make the written mark. The glittering effect becomes stronger (or more visible) as the particle size of the glitter pigment increases. As previously mentioned, glitter pigment particles having a particle size greater than about 12.1 microns provide a significant glitter effect when used in ink compositions. Consequently, glitter pigment particles preferably have a particle size greater than about 12.1 microns in at least one of the dimensions, more preferably a particle size greater than about 15 microns in at least one of the dimensions, even more preferably a particle size greater than about 20 microns in at least one of the dimensions and, most preferably a particle size greater than about 30 microns in at least one of the dimensions. Glitter pigment particles should not have a particle size greater than 5000 microns in any dimension. A preferred pigment is an aluminum flake pigment supplied by MD-Both Industries (West Chicago, Ill.).

The glitter pigment typically comprises about 0.1 percent by weight (wt. %) to about 90 wt. %, more preferably about 0.25 wt. % to about 50 wt. %, even more preferably about 0.50 wt. % to about twenty wt. %, and most preferably about one wt. % to about ten wt. % of the glitter ink compositions. Typically, at least about 40 wt. %, preferably at least about 50 wt. %, more preferably at least about 75 wt. % of the glitter pigment particles have at least one dimension greater than about 12.1 microns. In another embodiment, at least about 20 wt. %, preferably at least about 30 wt. %, more preferably at least about 50 wt. % of the glitter pigment particles have at least one dimension greater than about 20 microns. In further embodiment, at least about 15 wt. %, preferably at least about 20 wt. %, more preferably at least about 30 wt. % of the glitter pigment particles have at least one dimension greater than about 30 microns. Particle size analyses (including distributions) can be performed using well-known methods including laser diffraction, Non-Invasive Back-Scatter (NIBSR) optics, and Ultrasound technology. Commercially available particle size analyzers including those available from CPS Instruments may be used.

To augment the glitter effect provided by the glitter pigment, a coloring agent typically is added to the glitter ink compositions. The coloring agent can be a dye, a pigment (either "dry" or as a dispersion), or a mixture of a dye and a pigment; however, dyes are preferred for use in the glitter ink compositions, particularly for use in products intended for children, because dyes are washable. In contrast, most pigment colorants are sub-micron in size, and therefore can become entrapped in a matrix and cause permanent staining to upholstery, clothing, and other items. For a labile or temporary mark, a water-soluble dye is preferred. For a more permanent mark, a pigment, a polymeric dye, or an encapsulated dye (e.g., microsphere encapsulation) can be used. Such pigments or dyes can be added to the formulation as dried powder, pigment concentrate chips, granules, and pre-dispersed paste.

Suitable dyes include but are not limited to anionic and cationic dyes. The dyes can be basic, acid, direct, or reactive dyes. Examples of suitable dyes include Food Black No. 1, Food Black No. 2, Food Red No. 40, Food Blue No. 1, Food Yellow No. 7, and the like; FD & C dyes; Acid Black dyes (Nos. 1, 7, 9, 24, 26, 48, 52, 58, 60, 61, 63, 92, 107, 109, 118, 119, 131, 140, 155, 156, 172, 194, and the like); Acid Red dyes (Nos. 1, 8, 32, 35, 37, 52, 57, 92, 115, 119, 154, 249, 254, 256, and the like); Acid Blue dyes (Nos. 1, 7, 9, 25, 40, 45, 62, 78, 80, 92, 102, 104, 113, 117, 127, 158, 175, 183, 193, 209, and the like); Acid Yellow dyes (Nos. 3, 7, 17, 19, 23, 25, 29, 38, 42, 49, 59, 61, 72, 73, 114, 128, 151, and the like); Direct Black dyes (Nos. 4, 14, 17, 22, 27, 38, 51, 112, 117, 154, 168, and the like); Direct Blue dyes (Nos. 1, 6, 8, 14, 15, 25, 71, 76, 78, 80, 86, 90, 106, 108, 123, 163, 165, 199, 226, and the like); Direct Red dyes (Nos. 1, 2, 16, 23, 24, 28, 39, 62, 72, 227, 236, and the like); Direct Yellow dyes (Nos. 4, 11, 12, 27, 28, 33, 34, 39, 50, 58, 86, 100, 106, 107, 118, 127, 132, 142, 157, and the like); anthraquinone dyes; monoazo dyes; disazo dyes; phthalocyanine derivatives, including, for example, various phthalocyanine sulfonate salts; aza annulenes; fomazan copper complexes; triphenodioxazines; Bernacid Red 2BMN; Pontamine® dyes such as Pontamine® Brilliant Bond Blue A; Cibacron Brilliant Red 38-A (i.e., Reactive Red 4) (Aldrich Chemical); Drimarene Brilliant Red X-2B (i.e., Reactive Red 56) (Pylam, Inc.); Levafix® Brilliant Red E-4B (Mobay Chemical, Haledon, N.J.); Levafix® Brilliant Red E-6BA (Mobay Chemical); Procion® Red H8B (i.e., Reactive Red 31) (ICI America); Direct Brilliant Pink B Ground Crude (Crompton & Knowles); Cartasol Yellow GTF Presscake (Sandoz, Inc.); Cartasol Yellow GTF Liquid Special 110 (Sandoz, Inc.); Yellow Shade 16948 (Tricon); Basacid Black X34 (i.e., BASF X-34) (BASF); Carta Black 2GT (Sandoz, Inc.); Neozapon Red 492 (BASF); Orasol Red G (Ciba-Geigy); Direct Brilliant Pink B (Crompton-Knowles); Aizen Spilon Red C-BH (Hodogaya Chemical Company); Kayanol Red 3BL (Nippon Kayaku Company); Levanol Brilliant Red 3BW (Mobay Chemical Company); Levaderm Lemon Yellow (Mobay Chemical Company); Spirit Fast Yellow 3G; Aizen Spilon Yellow C-GNH (Hodogaya Chemical Company); Sirius Supra Yellow GD 167; Cartasol Brilliant Yellow 4GF (Sandoz, Inc.); Pergasol Yellow CGP (Ciba-Geigy); Orasol Black RL (Ciba-Geigy); Orasol Black RLP (Ciba-Geigy); Savinyl Black RLS (Sandoz); Dermacarbon 2GT (Sandoz); Pyrazol Black BG (ICI); Morfast Black Concentrate A (Morton-Thiokol); Diazol Black RN Quad (ICI); Orasol Blue GN (Ciba-Geigy); Savinyl Blue GLS (Sandoz, Inc.); Luxol Blue MBSN (Morton-Thiokol); Sevron Blue 5GMF (ICI); Basacid Blue 750 (BASF); Bemacid Red (Berncolors, Poughkeepsie, N.Y.); Berncolor A.Y. 34; Telon Fast Yellow 4GL-175; BASF Basacid Black SE 0228; various Reactive dyes, including Reactive Black dyes, Reactive Blue dyes, Reactive Red dyes such as Reactive red 180 and the like, Reactive Yellow dyes including Reactive yellow 37 and the like; and mixtures thereof The dye typically comprises about 0.01% wt. % to about 70 wt. %, more preferably about 0.1 wt. % to about 50 wt. %, even more preferably about 0.20 wt. % to about twenty wt. %, and most preferably about 0.50 wt. % to about twenty wt. % of the glitter ink compositions.

Polymeric dyes also are suitable for use as the coloring agent. Representative examples include, but are not limited to, the polymeric dyes produced by Milliken Corporation (Spartanburg, S.C.) in the Palmer dye product line.

Other applicable coloring agents also include dye-filled microspheres, which are spheres made with an organic polymer and filled with a dye solution. An example is a green colored microsphere supplied by Radiant (Richmond, Calif.).

Suitable pigments may include, but are not limited to organic pigments, inorganic pigments, and pigment precursors. The pigment typically comprises about 0.1% wt. % to about 90 wt. %, more preferably about 0.25 wt. % to about 50 wt. %, even more preferably about 0.50 wt. % to about twenty wt. %, and most preferably about one wt. % to about ten wt. % of the glitter ink compositions.

Suitable organic pigments include, but are not limited to, blue pigments such as Palomar Blue B-4810 PB 15:3, Palomar Blue B-4710 PB 15:1, and Palomar Blue B-4900 pigments (all available from Bayer Corp., Rock Hill, S.C.); Sunfast Blue 15:3 presscake and Sunfast Blue 15:3 powder (both available from Sun Chemical Corp., Cincinnati, Ohio); and alkaline blue pigment (available from BASF). Suitable red pigments include, but are not limited to, magenta pigments such as, for example, Quindo Magenta RV-6828 Pigment Red 122, Quindo Magenta RV-6831 Pigment Red 122 presscake, Quindo Red R-6713 PV 19, and Quindo Magenta RV-6843 Pigment Red 202 pigments (all available from Bayer Corp.); and Sunfast Magenta 122 and Sunfast Magenta 202 pigments (both available from Sun Chemical Corp.). Suitable yellow pigments include, but are not limited to, Fanchon Fast Y-5700 PY 139 and Fanchon Fast Yellow Y-5688 C.I. Pigment Yellow 150 pigments (available from Bayer Corp.); Sunbrite Yellow 14 presscake and Spectra Pac Yellow 83 pigments (both available from Sun Chemical Corp.); Sandorin Yellow 6GL (available from Clariant Corp., Charlotte, N.C.); and Irgazin Yellow 2RLT PY 110, Irgazin Yellow 2GLTN PY 109, Irgazin Yellow 2GLTE PY 109, and Irgazin Yellow 3RLTN PY 110 pigments (all available from Ciba Geigy). Suitable green pigments include, but are not limited to, copper phthalocyanine green pigments such as, for example, Pigment Green 1, Pigment Green 2, Pigment Green 7, and Pigment Green 36, and mixtures thereof. Violet pigments comprising a quinacridone or a benzimidazolone pigment also can be used. Such violet pigments include Pigment Violet 19, Pigment Violet 3, Pigment Violet 32, and Pigment Violet 23, and mixtures thereof. Orange pigments typically comprise a beta-naphthol pigment or a Naphthol Red pigment. Such orange pigments include Pigment Orange 5, Pigment Red 17, Pigment Red 188, Pigment Orange 62, Pigment Red 112, Pigment Red 255, Pigment Red 264, and Pigment Red 49:2, and mixtures thereof. Black pigments including carbon blacks, such as, for example, Special Black 4, Special Black 5, Special Black 6, Special Black 4A, Color Black FW 200, and Color Black FW2 pigments (all manufactured by Degussa Corporation, Ridgefield, N.J.); Raven 1200 carbon black, Raven 1170 carbon black, Raven 3500 carbon black, and Raven 5750 carbon black pigments (all available from Columbian Chemical Corp., Atlanta, Ga.); Mogul L carbon black and Sterling NS carbon black pigments (both available from Cabot Corp., Boston, Mass.); and Carbon Black MA-100 pigment (available from Mitsubishi Kasei Corp., Tokyo, Japan) also can be used.

Suitable inorganic pigments include, but are not limited to, white pigments such as, for example, titanium dioxide, zinc oxide, calcium carbonate, lead white (lead carbonate), and barium sulfate; blue pigments such as, for example, iron blue, cobalt blue, and ultramarine blue; black pigments such as, for example, black iron oxide (Iron (II, III) oxide) and logwood; brown pigments such as, for example, brown iron oxide and ochre; red pigments such as, for example, Cadmium Red and red iron oxide; yellow pigments such as, for example, Cadmium Yellow (CdS, CdZnS), Curcuma Yellow, yellow iron oxide, and Yellow Chrome Lead; green pigments such as, for example, Green Chromate Oxide, Malachite, ferrocyanides, and ferricyanides; violet pigments such as, for example, Manganese Violet (manganese ammonium pyrophosphate), various aluminum salts; and mixtures thereof.

Pigment precursors such as, for example, those described in U.S. Pat. No. 6,524,382, which is hereby incorporated herein by reference, also can be used in the inks according to the invention.

To enhance the color effect, the colorant pigment should not be too small (i.e., less than 0.1 microns in the largest of its dimensions). Larger colorant pigment particles tend to retain on the surface of porous material and exhibit an enhanced opacity as a result. The colorant pigment should be greater than about 0.1 microns in at least one of its dimensions, more preferably greater than about 0.5 microns in at least one of its dimensions, and most preferably greater than about 1 micron in at least one of its dimensions. The colorant pigment particle size, however, should not exceed 200 microns.

To achieve the preferred particle sizes, it is desirable to add the pigment to the ink composition as a dried powder or press-cake. Representative commercial pigments that can be used in the form of a presscake include: Heucophthal RTM Blue BT-585-P, Toluidine Red Y (C.I. Pigment Red 3), Quindo RTM Magenta (Pigment Red 122), Magenta RV-6831 presscake (Mobay Chemical), Sunfast RTM Magenta 122 (Sun Chemical Corp.), Indo RTM Brilliant Scarlet (Pigment Red 123, C.I. No. 71145), Toluidine Red B (C.I. Pigment Red 3), Watchung.RTM. Red B (C.I. Pigment Red 48), Permanent Rubine F6B13-1731 (Pigment Red 184), Hansa RTM Yellow (Pigment Yellow 98), Dalamar RTM Yellow YT-839-P (Pigment Yellow 74, C.I. No. 11741, Sunbrite RTM Yellow 17 (Sun Chemical Corp, Cincinnati, Ohio), Toluidine Yellow G (C.I. Pigment Yellow 1), Pigment Scarlet (C.I. Pigment Red 60), Auric Brown (C.I. Pigment Brown 6), etc.

To provide ink compositions capable of delivering glitter-like materials with a large particle size (i.e., particles having at least one dimension greater than about 12.1 microns) through capillary action, it is desirable to include a heteroatom-bearing solvent in the ink composition. The heteroatom of the solvent can be nitrogen, sulfur, or oxygen. Preferably, the heteroatom is nitrogen or sulfur. The solvent preferably is water-miscible.

In a preferred embodiment, the solvent is a polar, aprotic solvent, particularly when the glitter pigment is a metallic pigment. The use of a polar, aprotic solvent tends to advantageously stabilize the glitter pigments such that they are substantially, uniformly distributed in the glitter ink compositions, even after relatively long periods of non-use.

Suitable heteroatom-bearing solvents for use in the glitter ink compositions include, but are not limited to, morpholine, 2-pyrrolidine, N-methylpyrrolidinone, dimethylacetamide, dimethylfonnamide, dimethylsulfoxide, formamide, cyclohexylpyrrolidone, thiodiethanol, thiodiglyercol, sulfolane, propylene carbonate, ethylene carbonate, and glycerol. Substantially aprotic, heteroatom-bearing, polar solvents such as dimethylformamide and N-methylpyrrolidinone are preferred because such solvents help solvate the glitter pigments, particularly metallic pigments such as aluminum pigments, thereby helping to keep the glitter pigment substantially uniformly distributed throughout the glitter ink compositions. The heteroatom-bearing solvent constitutes about 0.1% wt. % to about 99.9 wt. %, more preferably from about 0.1 wt. % to about 50 wt. %, and most preferably from about 0.1 wt. % to about 30 wt. % of the glitter ink compositions.

A resin may also be included in the glitter ink compositions, depending on the intended application for the ink composition. The resin is typically present in an amount of about 0.1% wt. % to about 99.9 wt. %, more preferably from about 0.1 wt. % to about 50 wt. %, and most preferably from about 0.1 wt. % to about 30 wt. % of the glitter ink compositions.

If a temporary written marking is desired, a water soluble-resoluble resin can be used in the ink compositions; such resins can be re-solubilized after application of the ink composition to a substrate. Suitable water-soluble resins include, but are not limited to, low molecular polysaccharides, such as a hydroxyethylcellulose, carboxymethylcellulose, hydroxypropylcellulose, derivatized chitins, derivatized starches, carrageenan, and pullulan; poly(styrenesulfonic acid); poly(styrene-co-maleic anhydride); poly(alkyl vinyl ether-co-maleic anhydride); polyacrylamide; partially hydrolyzed polyacrylamide; poly(acrylic acid); poly(vinyl alcohol); partially hydrolyzed poly(vinyl acetate); poly(hydroxyethyl acrylate); poly(methyl vinyl ether); polyvinylpyrrolidone; poly(2-vinylpyridine); poly(4-vinylpyridine); poly(diallyldimethylammonium chloride), and the like.

If a dry erase formulation is desired, a resin that solidifies upon drying, without adhering to most surfaces should be used. A suitable resin is Rite Brite Br Base (Chemurgy, S.C.). To further enhance erasability, a release agent such as Silwet 7600 (OSI Specialty Products) may be included. Generally, any combination of a film-forming resin and release agent may be used to provide a dry-erase glitter ink composition.

However, if the desired application is a permanent marker, a resin that will not re-solubilize after drying should be added to the ink compositions. One class of such resins suitable for use in permanent markers according to the disclosure is polyacrylic acid and its co-polymers. Such resins contain labile cations such as, for example, ammonium cations. As the resin dries, it forms a film, ammonia gas evaporates from the dried film, and the film becomes water-insoluble. An example of a suitable polyacrylic acid resin is NeoCryl A1110 (NeoResin, N.J.). Another class of resins suitable for use in permanent markers according to the disclosure is self-crosslinking resins, for example, NeoCryl XK-12, which is an acrylic emulsion, and NeoPac E-125, which is a urethane/acrylic copolymer, (both available from NeoResin, N.J.). Self-crosslinking resins usually are cured when exposed to air (by oxidation) and humidity (by moisture).

The viscosity of the glitter ink compositions at 25° C. is usually less than about twenty centipoises (cps), preferably about one cps to about ten cps, and more preferably about one cps to about five cps. However, the ranges provided above can shift higher or lower, depending on the nature and porosity of the nibs and the fiber density of the ink reservoirs used in the markers according to the disclosure.

Other Additives

The ink may optionally contain other additives such as, for example, biocide(s), surface tension modifier(s), other synergic resin(s), surfactant(s), humectant(s), dispersing agent(s), and other additives known in the art. These additives can be added to the ink compositions in an amount such that the overall performance of the ink compositions is not adversely affected in any aspect.

The capillary-action, glitter markers and ink compositions in accordance with the disclosure can be better understood in light of the following examples, which are merely intended to illustrate the markers and ink compositions and are not meant to limit the scope thereof in any way.

Example 1

Six parts of water was mixed with three parts of dimethylformamide (DMF) to provide an initial, homogenous solvent mixture. 3 parts of a 1:1 mixture (by weight) of a styrene-acrylic resin (BT44, NeoResin, N.J.) and water was subsequently added to the mixture. 0.8 parts of glitter pigment particles (NW-3310, having a particle size of about 51 microns in at least one dimension, MD-Both Industries, West Chicago, Ill.) and 0.37 parts of a polymeric dye (Palmer Magenta, Milliken Chemical Company, Spartanburg, S.C.) were added to the mixture. Mixing was continued for approximately thirty minutes, i.e., until the glitter pigment particles were evenly distributed in the medium.

The ink composition was placed in a marker equipped with a melt-blown reservoir (Melt blown reservoir D3004, Filtrona, Colonial Heights, Va.) and a porous nib (GY-series, porosity=72%, Teibow, Tokyo, Japan). A washable pink glitter marking containing a high density of glitter was produced when this marker was used on paper.

Example 2

The procedure of example 1 was followed, except that N-methylpyrrolidinone (Aldrich Chemical Company, Milwaukee, Wis.) was used instead of dimethylformamide. As with the marker of example 1, a pink trace with a high density of glitter was produced when a written mark was made.

Comparative Example 3

The procedure of Example 1 was followed, except that propylene glycol was used instead of dimethylformamide. When a marker including this ink composition was used, a pink trace was produced with substantially less glitter than the written markings made with the markers of examples 1 and 2.

Example 4

To a homogenous mixture of 42.5 parts of deionized water and 42.5 parts of a styrene-acrylic resin (A1110, NeoResin, N.J.), 18 parts of an aluminum flake pigment (NW 3200, MD-Both Industries, West Chicago, Ill.) and 5 parts of a green microsphere powder (GRN5511, Radiant Company, Richmond, Calif.) were added. The mixture was stirred for another 30 minutes.

When the ink was used with the marker construction described in Example 1, a green opaque trace with a high density of glitter was observed. The trace on paper was found to be water-resistant and the marker made a permanent, green marking containing glitter-like material.

Although the foregoing text is a detailed description of numerous different embodiments of a capillary-action, glitter marker, and a glitter ink composition, the detailed description is to be construed as exemplary only and does not describe every possible embodiment of a capillary-action glitter marker or a glitter ink composition in accordance with the disclosure. Consequently, the only limitations which should be placed upon the capillary-action glitter markers or glitter ink compositions in accordance with the disclosure are those which appear in the appended claims.

What is claimed is:

1. A capillary-action marker comprising:
   (a) a glitter ink composition comprising glitter pigment particles, at least 20 wt. % of the glitter pigment particles having a particle size greater than about 20 microns in at least one dimension; at least one solvent; and a film forming resin, wherein the viscosity of the ink composition is less than about 20 centipoises at 25° C., and the glitter ink composition comprises about 0.1 percent by weight (wt. %) to about 90 wt. % glitter pigment particles;
   (b) a low density ink reservoir for storing the glitter ink composition; and,
   (c) a porous nib in fluid communication with the low density ink reservoir.

2. The capillary-action marker of claim 1, wherein the glitter pigment particles are selected from the group consisting of metallic pigments, dual color pigments, holographic pigments, interference pigments, glass pieces, colored glass powders, non-colored glass powders, synthetic diamonds, pearlescent pigments, metallized plastics, iridescent pigments, micronized marble particles, and micas.

3. The capillary-action marker of claim 1, wherein the glitter pigment particles comprise metallic pigments selected from the group consisting of gold pigments, copper pigments, nickel pigments, silver pigments, platinum pigments, and aluminum pigments.

4. The capillary-action marker of claim 3, wherein the metallic pigments comprise protected metal particles.

5. The capillary-action marker of claim 1, wherein the solvent comprises a heteroatom-bearing solvent.

6. The capillary-action marker of claim 5, wherein the heteroatom-bearing solvent is water-miscible.

7. The capillary-action marker of claim 5, wherein the heteroatom-bearing solvent comprises a polar, aprotic solvent.

8. The capillary-action marker of claim 5, wherein the heteroatom-bearing solvent is selected from the group consisting of morpholine, 2-pyrrolidine, N-methylpyrrolidinone, dimethylacetamide, dimethylformamide, dimethylsulfoxide, formamide, cyclohexylpyrrolidone, thiodiethanol, thiodiglycerol, sulfolane, propylene carbonate, ethylene carbonate, and glycerol.

9. The capillary-action marker of claim 5, wherein the heteroatom-bearing solvent is selected from the group consisting of formamide, dimethylformamide, and N-methylpyrrolidinone.

10. The capillary-action marker of claim 1, wherein at least about 15 wt. % of any remaining glitter pigment particles have at least one dimension greater than about 30 microns.

11. The capillary-action marker of claim 1, wherein at least about 25 wt. % of any remaining glitter pigment particles have at least one dimension greater than about 15 microns.

12. The capillary-action marker of claim 1, wherein the glitter ink composition further comprises a coloring agent.

13. The capillary-action marker of claim 12, wherein the coloring agent is selected from the group consisting of a dye and a pigment.

14. The capillary-action marker of claim 1, wherein the glitter ink composition further comprises a dye.

15. The capillary-action marker of claim 1, wherein the glitter pigment particles comprise metallic pigments, the solvent comprises a heteroatom-bearing solvent, and the ink composition further comprises a coloring agent.

16. The capillary-action marker of claim 15, wherein the coloring agent is a dye.

17. The capillary-action marker of claim 1, wherein the film-forming resin is a water soluble-resoluble film-forming resin.

18. The capillary-action marker of claim 1, wherein the ink composition further comprises a release agent.

19. The capillary-action marker of claim 1, wherein the film-forming resin forms a water-insoluble film.

20. A capillary-action marker comprising:
   (a) a glitter ink composition comprising glitter pigment particles having a particle size greater than about 12.1 microns in at least one dimension; a heteroatom-bearing, water-miscible solvent; and a film-forming resin, wherein the viscosity of the ink composition is less than about 20 centipoises at 25° C., and the glitter ink composition comprises about 0.1 percent by weight (wt. %) to about 90 wt. % glitter pigment particles;
   (b) a low density ink reservoir for storing the glitter ink composition; and,
   (c) a porous nib in fluid communication with the low density ink reservoir.

21. The capillary-action marker of claim 20, wherein the glitter pigment particles are selected from the group consisting of metallic pigments, dual color pigments, holographic pigments, interference pigments, glass pieces, colored glass powders, non-colored glass powders, synthetic diamonds, pearlescent pigments, metallized plastics, iridescent pigments, micronized marble particles, and micas.

22. The capillary-action marker of claim 20, wherein the heteroatom-bearing, water-miscible solvent comprises a polar, aprotic solvent.

23. The capillary-action marker of claim 20, wherein at least about 40 wt. % of the glitter pigment particles have at least one dimension greater than about 12.1 microns.

24. The capillary-action marker of claim 20, wherein at least about 25 wt. % of the glitter pigment particles have at least one dimension greater than about 15 microns.

25. The capillary-action marker of claim 20, wherein at least about 20 wt. % of the glitter pigment particles have at least one dimension greater than about 20 microns.

26. The capillary-action marker of claim 20, wherein the glitter ink composition further comprises a coloring agent.

27. The capillary-action marker of claim 20, wherein the coloring agent is selected from the group consisting of a dye and a pigment.

28. The capillary-action marker of claim 20, wherein the glitter pigment particles comprise metallic pigments, and the ink composition further comprises a coloring agent.

29. The capillary-action marker of claim 28, wherein the coloring agent is a dye.

30. A capillary-action marker comprising:
   (a) a glitter ink composition comprising glitter pigment particles, at least 20 wt. % of the glitter pigment particles having a particle size greater than about 20 microns in at least one dimension, at least one solvent, a film-forming resin, and a dye, wherein the viscosity of the ink composition is less than about 20 centipoises at 25° C.;
   (b) a low density ink reservoir for storing the glitter ink composition; and,
   (c) a porous nib in fluid communication with the low density ink reservoir.

31. The capillary-action marker of claim 30, wherein the solvent comprises a heteroatom-bearing solvent.

32. The capillary-action marker of claim 31, wherein the heteroatom-bearing solvent comprises a polar, aprotic solvent.

33. The capillary-action marker of claim 30, wherein at least about 25 wt. % of any remaining glitter pigment particles have at least one dimension greater than about 15 microns.

34. A glitter ink composition comprising:
    (a) a heteroatom-bearing, water-miscible solvent;
    (b) glitter pigment particles having a particle size greater than about 12.1 microns in at least one dimension; and,
    (c) a film-forming resin, wherein the viscosity of the ink composition is less than about 20 centipoises at 25° C., and the glitter pigment particles comprise about 0.1 percent by weight (wt. %) to about 90 wt. % of the glitter ink composition.

35. The glitter ink composition of claim 34, wherein the glitter pigment particles are selected from the group consisting of metallic pigments, dual color pigments, holographic pigments, interference pigments, glass pieces, colored glass powders, non-colored glass powders, synthetic diamonds, pearlescent pigments, metallized plastics, iridescent pigments, micronized marble particles, and micas.

36. The glitter ink composition of claim 34, wherein the heteroatom-hearing, water-miscible solvent comprises a polar, aprotic solvent.

37. The glitter ink composition of claim 34, wherein at least about 40 wt. % of the glitter pigment particles have at least one dimension greater than about 12.1 microns.

38. The glitter ink composition of claim 34, further comprising a coloring agent.

39. The glitter ink composition of claim 38, wherein the coloring agent is selected from the group consisting of a dye and a pigment.

40. The glitter ink composition of claim 34, wherein the film-forming resin is a water soluble-resoluble film-forming resin.

41. The glitter ink composition of claim 34, further comprising a release agent.

42. The glitter ink composition of claim 34, wherein the film-forming resin forms a water-insoluble film.

43. A glitter ink composition comprising:
    at least one solvent, glitter pigment particles, at least 20 wt. % of the glitter pigment particles having a particle size greater than about 20 microns in at least one dimension, a film-forming resin, and a dye, wherein the viscosity of the ink composition is less than about 20 centipoises at 25° C.

44. The glitter ink composition of claim 43, wherein the solvent comprises a heteroatom-bearing solvent.

45. The glitter ink composition of claim 43, wherein the solvent comprises a polar, aprotic solvent.

46. The litter ink composition of claim 43, wherein the glitter pigment particles comprise about 0.1 percent by weight (wt. %) to about 90 wt. % of the glitter ink composition.

47. The glitter ink composition of claim 43, wherein at least about 25 wt. % of any remaining glitter pigment particles have at least one dimension greater than about 15 microns.

* * * * *